(12) United States Patent
Henrie et al.

(10) Patent No.: US 6,970,493 B2
(45) Date of Patent: *Nov. 29, 2005

(54) DIODE-PUMPED LASER WITH FUNNEL-COUPLED PUMP SOURCE

(75) Inventors: Jason D. Henrie, Los Altos, CA (US); William L. Nighan, Jr., Menlo Park, CA (US)

(73) Assignee: Spectra Physics, Inc., Mountain View, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 10/738,124

(22) Filed: Dec. 16, 2003

(65) Prior Publication Data

US 2004/0170206 A1    Sep. 2, 2004

Related U.S. Application Data

(63) Continuation of application No. 09/401,146, filed on Sep. 22, 1999, now Pat. No. 6,665,328.

(60) Provisional application No. 60/116,455, filed on Jan. 19, 1999.

(51) Int. Cl.[7] ............................................. H01S 3/09
(52) U.S. Cl. ........................ 372/69; 372/92; 372/99; 372/103
(58) Field of Search ........................ 372/69–72, 75, 372/92, 96, 98, 99, 103

(56) References Cited

U.S. PATENT DOCUMENTS

| 4,820,010 | A |   | 4/1989  | Scifres et al. ........... 350/96.15 |
| 5,097,471 | A |   | 3/1992  | Negus et al. ................. 372/18 |
| 5,163,059 | A |   | 11/1992 | Negus et al. ................. 372/18 |
| 5,307,430 | A |   | 4/1994  | Beach et al. ................. 385/31 |
| 5,323,414 | A |   | 6/1994  | Baird et al. .................. 372/75 |
| 5,572,542 | A | * | 11/1996 | Dixon .......................... 372/92 |
| 5,619,522 | A |   | 4/1997  | Dube ............................ 372/72 |
| 5,627,847 | A |   | 5/1997  | Leger ............................ 372/9 |
| 5,743,901 | A |   | 4/1998  | Grove et al. ................... 606/9 |
| 5,859,868 | A |   | 1/1999  | Kyusho et al. ................. 372/75 |
| 5,867,329 | A | * | 2/1999  | Justus et al. ................. 359/861 |
| 6,038,244 | A |   | 3/2000  | Usui et al. .................... 372/75 |
| 6,101,201 | A |   | 8/2000  | Hargis et al. .................. 372/36 |
| 6,347,101 | B1| * | 2/2002  | Wu et al. ....................... 372/18 |
| 6,370,174 | B1|   | 4/2002  | Onkels et al. ............. 372/38.04 |

(Continued)

FOREIGN PATENT DOCUMENTS

FR      2 765 411     12/1998    ........... H01S 3/093

*Primary Examiner*—Minsun Oh Harvey
*Assistant Examiner*—Delma R. Flores-Ruiz
(74) *Attorney, Agent, or Firm*—Heller Ehrman LLP

(57) ABSTRACT

An optically pumped laser has a gain medium positioned inside of an optical resonator cavity and disposed about a resonator optical axis. An optical pumping source is positioned outside of the optical resonator cavity. A reflective coupler with a coupler body, and an interior volume passing therethrough is positioned proximal to the optical pumping source. Light from the pumping source passes into an entrance aperture of the reflective coupler to an exit aperture of the reflective coupler positioned distal to the optical pumping source. The interior volume of the reflective coupler is bounded by a reflective surface, an entrance aperture and the exit aperture, and is substantially transparent to radiation from the optical pumping source. The reflective surface has a high reflectivity matched to radiation from the optical pumping source. The reflective coupler directs radiation from the optical pumping source into the optical resonator cavity and gain medium, conditioning the numerical aperture and spatial intensity distribution across the exit aperture.

27 Claims, 10 Drawing Sheets

U.S. PATENT DOCUMENTS

| | | |
|---|---|---|
| 6,370,178 B1 | 4/2002 | Papayoanou et al. ......... 372/64 |
| 6,373,867 B1 | 4/2002 | Lin et al. ...................... 372/18 |
| 6,373,868 B1 * | 4/2002 | Zhang ......................... 372/19 |
| 6,381,256 B1 | 4/2002 | Stamm et al. ................ 372/19 |
| 6,665,328 B1 * | 12/2003 | Henrie et al. ................ 372/69 |

* cited by examiner

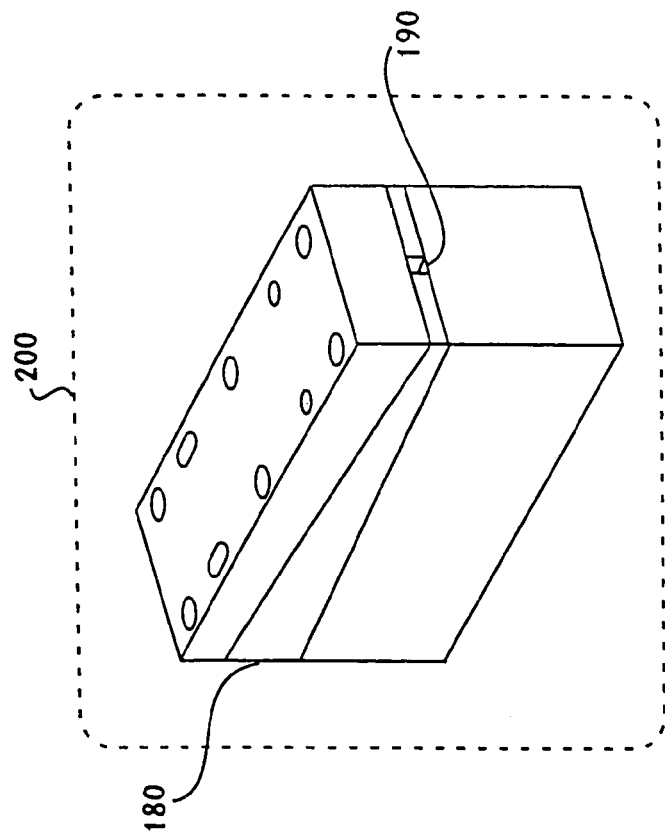
FIG. 2
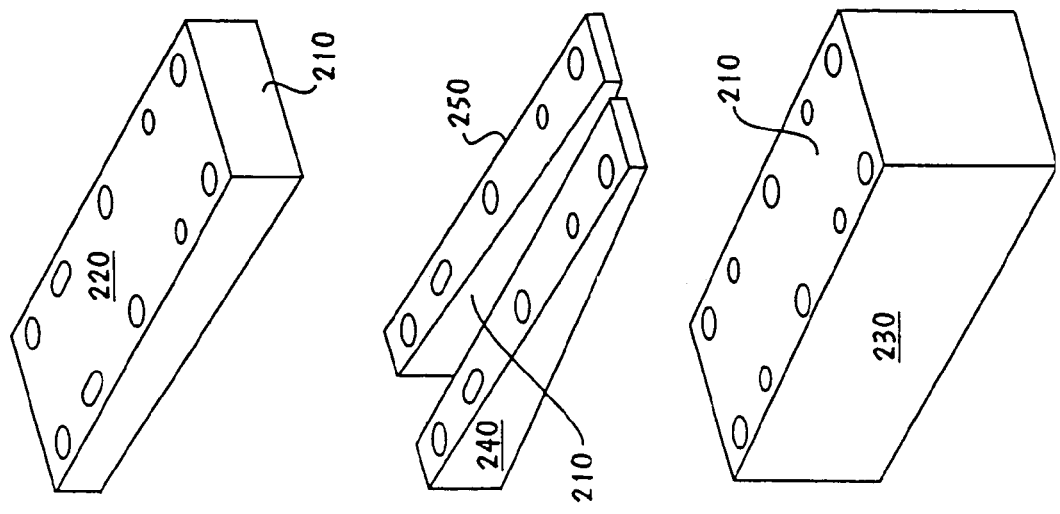

DIODE-PUMPED LASER WITH FUNNEL-COUPLED PUMP SOURCE

CROSS REFERENCE TO RELATED APPLICATION

This application is a continuation of U.S. Utility application Ser. No.: 09/401,146, filed Sep. 22, 1999, now U.S. Pat. No. 6,665,328 which claims the benefit of prior filed Provisional Application No.: 60/116,455, filed Jan. 19, 1999.

BACKGROUND OF THE INVENTION

1. Field of the Invention

The present invention relates to solid state lasers, and specifically to diode-pumped solid state lasers.

2. Description of the Related Art

New generations of diode-pumped solid state lasers utilize stacks of diode laser bars to generate pump beams. The increased power afforded by such arrangements of diode bars as compared to a single diode or single diode bar allows new levels of performance to be achieved in the laser receiving the pump radiation. However, since a stack of diode bars may extend over centimeters or tens of centimeters, additional difficulties are present in efficiently coupling the pump energy from such a diode stack with the gain medium of the pumped laser. These difficulties are in addition to the well-known difficulties associated with the highly divergent and non-isotropic output of a single diode laser.

To efficiently couple with another laser cavity, the spatially-extended and highly divergent pump beam from a stack of diode bars may have it's physical size and angular divergence controlled. In addition, the pump beam's spatial intensity profile may also be controlled in order to facilitate good matching of the volumes of the activated gain medium and the resonator modes in the laser cavity receiving the pump energy. Such a device may also have heat transfer requirements imposed by the considerable power that only a fractional loss in the coupling of the diode stack output power may entail.

Prior art techniques address the above difficulties in ways that are overly complex with respect to coupling optics, or do not meet the multiplicity of requirements for efficient coupling of extended emitters to laser cavities, or are simply not economical or sufficiently rugged for commercial use. For example, U.S. Pat. Nos. 5,307,430 and 5,323,414 to Beach and Baird, respectively, describe lens ducts. According to the teachings of these patents, the lens ducts rely on Total Internal Reflection (TIR) to guide the pump light from the stack to the gain medium. TIR requires a precisely defined and nearly discontinuous change in the refractive index across the interface between the duct and the duct's exterior environment. This dependence on TIR makes it very difficult to cool the device since mounting the lens duct to a heat sink or other structure may violate the requirements for TIR. In the prior art, losses in such ducts are typically greater than 20%, resulting in reduced overall efficiencies and potentially problematic thermal management situations. Further, U.S. Pat. No. 5,307,430 and U.S. Pat. No. 5,323,414 do not teach or suggest conditioning of the pump beams intensity profile, mechanical registration or methods of cooling of the coupling device.

U.S. Pat. No. 5,743,901, by Grove, teaches a hollow non-imaging light collection device to collect light from a two-dimensional diode array and deliver it to skin after many internal reflections within the hollow device which act to "mix" the light. However. U.S. Pat. No. 5,743,901 does not teach or suggest conditioning the output intensity profile or Numerical Aperture (NA) of the device, and not in any manner optimized for pumping a gain medium.

Thus, there is a need in the field for simple, economical, robust, and efficient methods and apparatae for coupling high power, spatially extended emitters to laser cavities. In particular, there is a need for coupling devices that couple the output of high power, spatially extended, diode devices to solid-state lasers for the purpose of pumping the solid state laser. There is also a need for solid state lasers incorporating coupling devices configured to control the pump light intensity profile and numerical aperture (NA) in the gain medium. Such controlled coupler output enhances the performance of the diode-pumped solid-state laser. Further, there is a need for a diode-pumped solid-state laser system with a coupling device that allows for field-replaceability of the high power, spatially extended diode device without requiring readjustment of the laser head.

SUMMARY OF THE INVENTION

An object of the present invention is to provide a method and apparatus that couples a highly divergent and spatially extended pump source to a laser resonator.

Another object of the present invention is to provide a method and apparatus that couples a highly divergent output from a stack of diode bars to a laser resonator.

A further object of the present invention is to provide a method and apparatus that conditions the spatial intensity distribution of a pump source.

Yet another object of the present invention is to provide a method and apparatus that conditions the numerical aperture of a pump source.

Another object of the present invention is to provide a method and apparatus that conditions the fluence of a pump source.

Yet another object of the present invention is to provide a laser system with improved ease of replaceability of a pump source for the laser system.

These and other objects of the present invention are achieved in an optically pumped laser. A gain medium is positioned inside of an optical resonator cavity and disposed about a resonator optical axis. An optical pumping source is positioned outside of the optical resonator cavity. A reflective coupler with a coupler body, and an interior volume passing therethrough is positioned proximal to the optical pumping source. Light from the pumping source passes into an entrance aperture of the reflective coupler to an exit aperture of the reflective coupler positioned distal to the optical pumping source. The interior volume of the reflective coupler is bounded by a reflective surface, an entrance aperture and the exit aperture, and is substantially transparent to radiation from the optical pumping source. The reflective surface has a high reflectivity matched to radiation from the optical pumping source. The reflective coupler directs radiation from the optical pumping source into the optical resonator cavity and gain medium, conditioning the numerical aperture and spatial intensity distribution across the exit aperture.

In another embodiment, a pump source laser resonator and a reflective coupler are provided with the reflective coupler positioned to receive an input from the pump source and deliver an output to the laser resonator. The reflective coupler conditions the angular divergence and spatial intensity profile of the output of the pump source to render the output of the laser resonator nearly constant as the pump source is replaced.

In another embodiment of the present invention, a method of optically pumping a gain medium includes conditioning a fluence of an optical pump source beam with a reflective coupler prior to illuminating a gain medium with the optical pump source. An angular divergence or numerical aperture of an optical pump source beam is conditioned with a reflective coupler prior to illuminating a gain medium with the optical pump source beam. Additionally, a spatial intensity distribution of an optical pump source beam with a reflective coupler is conditioned prior to illuminating a gain medium with the optical pump source beam.

BRIEF DESCRIPTION OF THE FIGURES

FIG. 2 shows an exploded view of a reflective coupler assembly.

DETAILED DESCRIPTION

Spatially extended optical pumping sources, such as stacks of diode laser bars, may extend over centimeters or tens of centimeters. The difficulties present in efficiently coupling the pump energy from such a diode stack with the gain medium of the pumped laser are in addition to the well-known difficulties associated with the highly divergent and non-isotropic output of a single diode laser.

As taught in the prior art, the spatially extended and highly divergent pump beam from spatially extended optical pumping sources, such as stacks of diode laser bars, should have its fluence and NA conditioned to efficiently couple with another optical cavity. However, prior art couplers rely on refraction to guide the pump beam, not reflection. The precise control of refractive index required for TIR does not allows such prior art devices to be easily attached to a heat sink or other cooling mechanism. A reflective coupler according to this invention overcomes such deficiencies. Moreover, according to the present invention, not only are the pump beam's fluence and NA conditioned the pump beam's spatial intensity profile is also conditioned to facilitate good matching of the volumes of the activated gain medium and the resonator modes in the laser cavity extracting the pump power.

According to aspects of this invention, a reflective coupler enables efficient coupling of a spatially extended optical pumping source and an optical cavity of a laser. A reflective coupler apparatus not only conditions the fluence and NA of the radiation received from the optical pumping source, but it also conditions the spatial intensity profile of the input radiation. Thus, according to aspects of this invention, the effects of the reflective coupler are not merely like those of collectors or condensers or refractive elements and other devices well known in the art of optics. The present invention also has characteristics similar to those of an integrating sphere, in that multiple reflections alter an intensity distribution. The action of the reflective coupler of this invention, however, is distinct from that of an integrating sphere in that the output spatial intensity distribution is not necessarily uniform. Moreover, the present invention is very economical, practical, compact and lends itself to simple, robust and insensitive alignment with the optical pumping source and laser cavity. The insensitive alignment facilitates field replacement of the diode pump source with no need for readjustment of the laser head.

Figure 1:
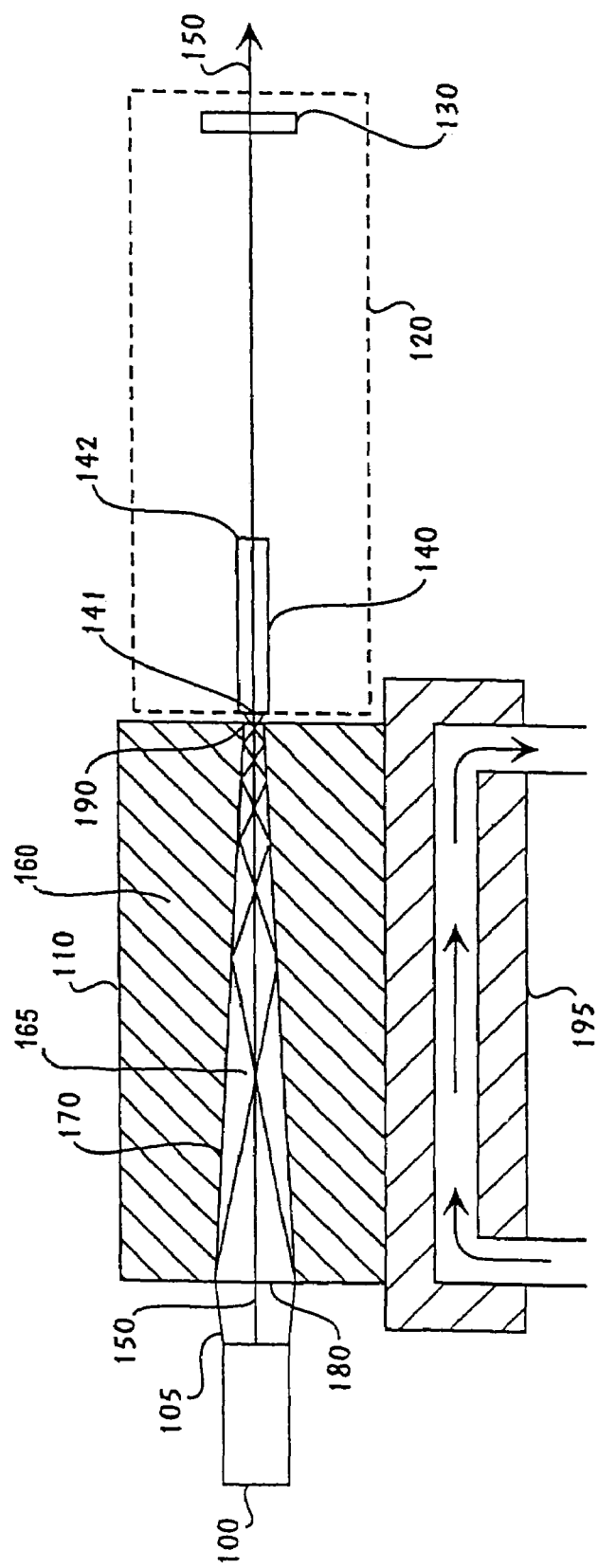
FIG. 1 illustrates the use of the reflective coupler to couple the pump light from a diode stack to a gain medium located inside a laser resonator. In this embodiment the exit aperture of the reflective coupler is butted directly to the end of the laser rod.

FIG. 1 shows a system overview for a particular embodiment of the invention. In FIG. 1, optical pumping source 100, limiting rays 105, reflective coupler 110, optical resonator 120, reflectors 130, gain medium 140, optical axis 150, coupler body 160, interior volume 165, reflective surfaces 170, entrance aperture 180, exit aperture 190, and cooler 195 are shown.

In FIG. 1, light rays from optical pumping source 100, including limiting rays 105, are captured by reflective coupler 110 at entrance aperture 180. After undergoing multiple reflections at reflective surfaces 170 while traversing interior volume 165 of coupler body 160, radiation passes through exit aperture 190 and into gain medium 140. The radiation then passes to optical resonator 120 through one of reflectors 130. Pumping radiation generates amplification in gain medium 140. Reflector 130 and the reflective coating on the entrance face 142 of the gain medium 140 provide optical feedback to sustain laser oscillation in the optical resonator. Although pumping longitudinal to the optical axis 150 is depicted in FIG. 1, pumping transverse to the optical axis is also possible in alternate embodiments. Cooler 195 is in thermal communication with the coupler body and acts to remove heat generated by the interaction of the pumping radiation with the small but finite absorption of the reflective surfaces.

As described, passing through the reflective coupler alters, or conditions, the fluence, numerical aperture, and spatial intensity distribution of the optical pump source beam in a manner designed to properly match the output from the optical pump source to the characteristics of the optical cavity and gain medium. In certain embodiments, this involves minimization of the NA at the exit aperture. This is achieved in certain embodiments of the invention by designing a coupler that is sufficiently long to provide a smooth intensity profile at the exit aperture, but sufficiently short to prevent an excessive increase in NA of the exit aperture. Additionally, the coupler design is sufficiently short to ensure high throughput.

In FIG. 1, reflective coupler 110 may be fabricated from many types of materials. Typical embodiments include couplers with coupler body 160 made from metals, such as copper, aluminum or other materials, preferably with good thermal conductivity. Accordingly, reflective surface 170 may be substantially metallic in certain embodiments. In these cases a surface finish roughness as high as 16 is adequate. Those skilled in the mechanical arts recognize this measurement as a root mean square (RMS) measurement with units of micro-inches. It is noteworthy that machining to this surface finish is within the capabilities of ordinary machine shops. Other embodiments include couplers with a coupler body that is substantially glass or another non-metal material used as a reflector.

Typically, a portion of coupler body 160 is coated with a coating layer, forming reflective surface 170. Typical coating layers are formed from multi-layer dielectric coatings, gold or silver or aluminum or nickel or chrome or other highly reflective materials. Metal coatings such as gold, or silver, or nickel, or chrome, are typically applied by an electroplating process. Other processes may also be used. A preferred embodiment uses gold, which is well known to have a reflectivity of at least 96% at a preferred diode pump wavelength of 808 nm.

In certain embodiments, coupler 160 is in thermal communication with cooler 195. The cooler acts to remove heat generated by the interaction of the pumping radiation with the small but finite absorption of the reflective surfaces 170. Particular embodiments of the cooler are a conduction cooler or a convection cooler. A conduction cooler transfers energy as heat primarily by a thermal diffusion mechanism. A convection cooler transfers energy as heat primarily by a fluid motion mechanism. A further benefit of this design over TIR designs in the prior art is the ability to use materials with high thermal conductivity. Additionally, very high throughputs can be achieved with the present invention's hollow reflective design: >90% as compared to ~75% in prior art. This has a significant impact on efficiency and thermal management.

In a preferred embodiment, such as in FIG. 1, optical pumping source 100 is a diode stack comprised of six diode bars in a vertical array with an output power of around 200W and an output wavelength matched to the absorption wavelength of the gain medium, in this case 808 nm. The overall dimensions of the diode stack emitting area in this preferred embodiment are around 10 mm×10 mm square. In this embodiment, a fast axis divergence of the output beam of each diode bar of the stack is preconditioned using a small, cylindrical lens. The light emitted in the fast axis of the individual laser bars in the stack has a divergence angle of four degrees, measuring the diode laser beam full width at 10% of the maximum (FW10% M). The divergence angle of the individual laser bars in the slow axis is approximately ten degrees FW10% M.

As illustrated in FIG. 1, reflective coupler 110 is placed in close proximity to the end of gain medium 140 in preferred embodiments. In such embodiments, the laser is end-pumped, as opposed to side-pumped. End-pumping generally provides higher efficiencies and better spatial mode control than other pumping schemes. The gain medium in a preferred embodiment of this invention is a Nd:YAG crystal measuring approximately 4 mm in diameter and 25 mm in length. A dopant level of Nd:YAG in the gain medium varies from about 0.1 to 1.1 atomic percent, with a preferred dopant level of 0.2 to 0.4 atomic percent. Input face 141 (see FIG. 1) of the gain medium has a dichroic coating which has a high transmission at the diode pump wavelength, i.e. 808 nm, and a high reflectivity at the laser emission wavelength of gain medium, i.e. 1064 nm. With a high reflectivity at the laser emission wavelength, the input face of the gain medium may act one of the mirrors that define resonator 120. Output face 142 of gain medium has a dichroic coating that has a high transmission at the laser emission wavelength of gain medium, i.e. 1064 nm. A mirror that is partially transmitting at the gain medium emission wavelength is used as output coupler 130 and is the second mirror that defines the resonator. Typical transmission at the emission wavelength of emission wavelength is between 1 and 40%.

In the preferred embodiment, close attention must be paid to the thermal management of gain medium 140. As a result of end-pumping, the majority of the pump light and corresponding waste heat is deposited in the pumped end of the gain medium. Thus, the pumped end of the gain medium may require significant cooling. The gain medium 140 may be cooled directly or indirectly by water. In one preferred embodiment the gain medium 140 is optically contacted to a transparent pump window made of thermally conductive material such as undoped YAG or sapphire. This allows cooling water to flow directly around the pumped end of the gain medium: heat flow from the laser crystal is radial into the water and longitudinal into the window. D. C. Brown. R. Nelson and L. Billings. "Efficient cw end-pumped, end-cooled Nd:YVO4 diode-pumped laser." Applied Optics, Vol. 36, No. 33, pp. 8611–8613, November 1997 and R. Weber. B. Neuenschwander. M. Mac Donald, M. B. Roos, and H. P. Weber, "Cooling Schemes for Longitudinally Diode Laser Pumped Nd:YAG Rods," IEEE Journal of Quantum Electronics, Vol. 34, No. 6, pp. 1046–1053, June 1998, hereby incorporated in their entireties by reference, provide examples of such configurations. In another preferred embodiment the gain medium is soldered into a water cooled, thermally conductive heat sink. In preferred embodiments, similar results can be achieved with either cooling configuration.

As shown in FIG. 2, reflective coupler 110 (see FIG. 1) may be an assembly comprising several elements. In FIG. 2, reflective coupler assembly 200, reflective surfaces 210, assembly elements 220, 230, 240, 250, entrance aperture 180, and exit aperture 190 are shown. In a typical embodiment, the reflective coupler assembly has the entrance aperture measuring approximately 11 mm×11 mm square, the exit aperture measuring approximately 2.5 mm×2.5 mm square with a reflective coupler assembly length of approximately 75 mm. In a particular embodiment, elements of the reflective coupler assembly 200 are made from aluminum and plated with gold. The reflective surfaces typically have a surface roughness of 1, a figure of merit understood in the mechanical arts. In a typical embodiment, the reflective coupler assembly is mounted on cooler 195 (see FIG. 1), which may be a water-cooled copper heat sink, for thermal control.

Figure 3A:
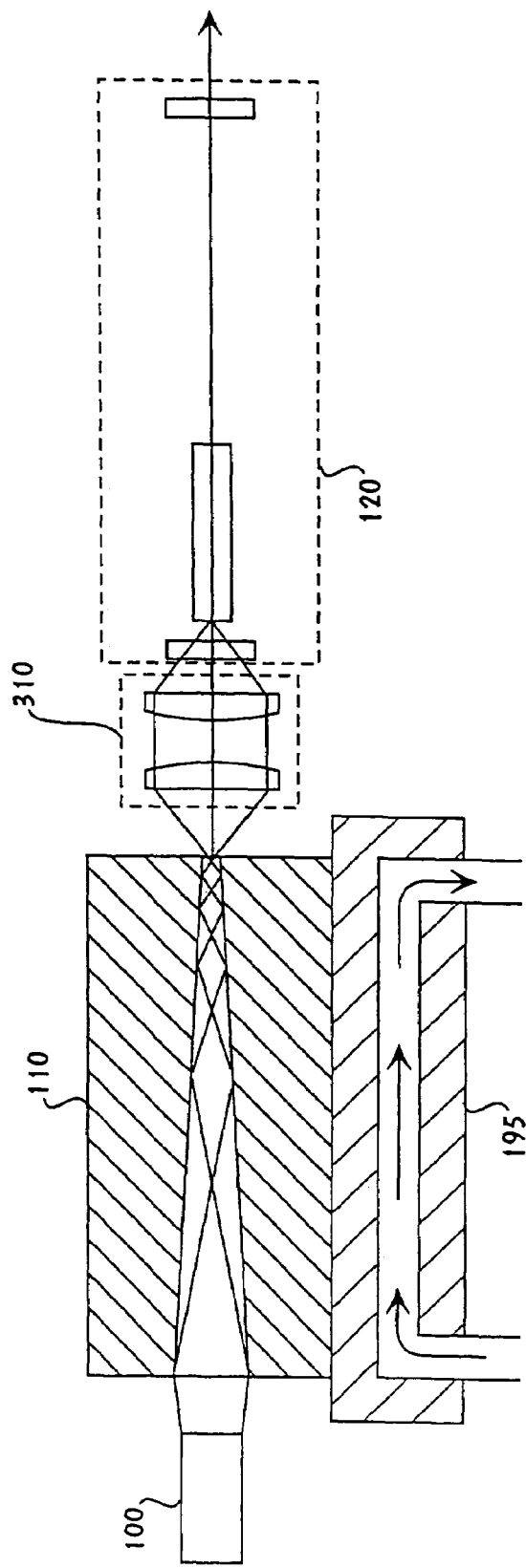
FIG. 3a illustrates the use of imaging optics to couple the light collected by the reflective coupler to the gain medium located inside a laser resonator. This configuration is preferable when some working distance is required between the reflective coupler and the gain medium.
Figure 3B:
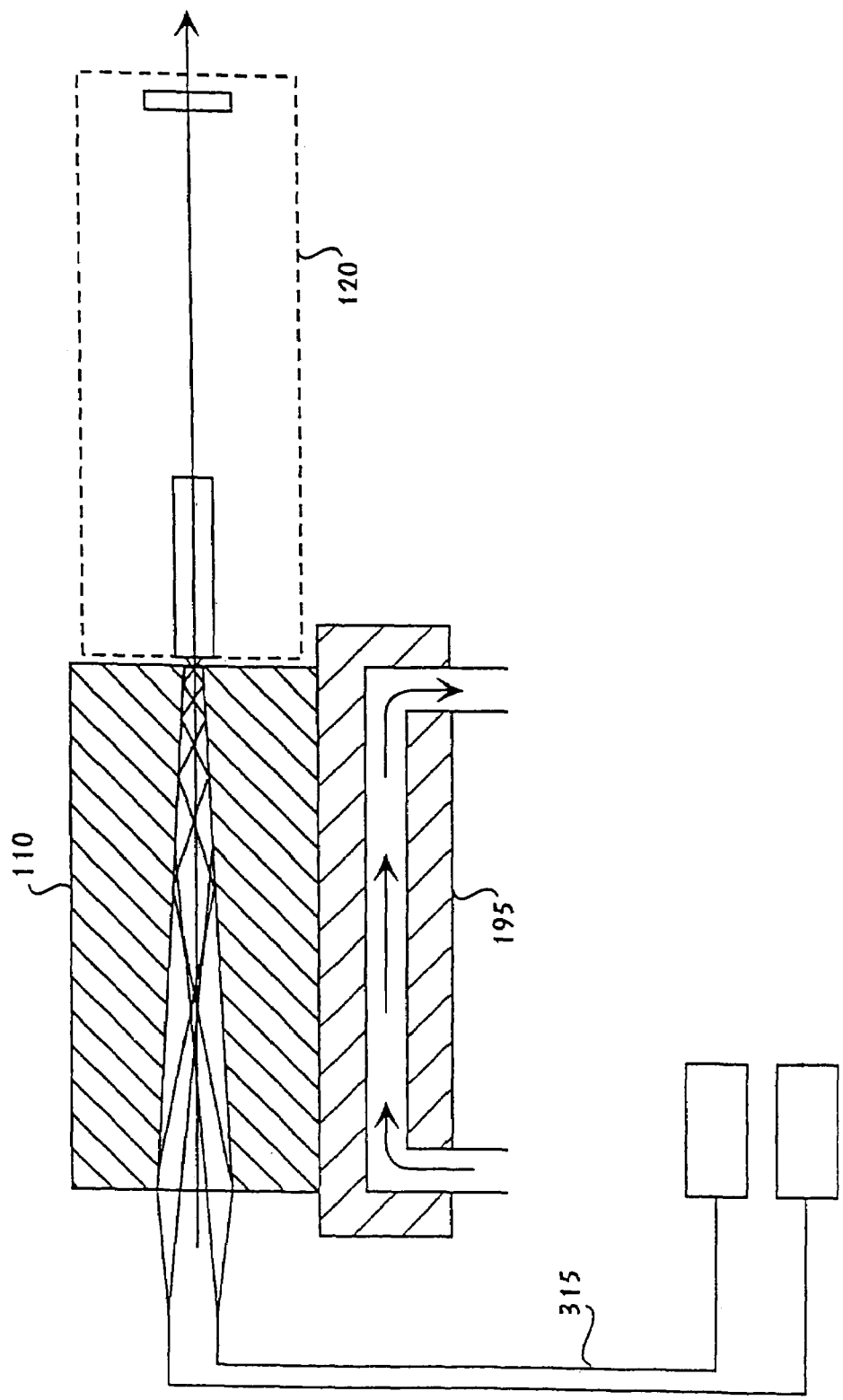
FIG. 3b illustrates the use of a fiber-coupled pump source or multiple fiber-coupled pump sources coupled to a gain medium using a reflective coupler.

FIG. 3a and FIG. 3b show alternate embodiments of the invention. The embodiment of FIG. 3a further comprises refractive element 310 placed between reflective coupler 110 and gain medium 140. In this embodiment, the refractive element or elements condition the output beam of the reflective coupler such that light is incident on the gain medium some distance away from exit aperture 190 of the reflective coupler. For example, a refractive element may partially or fully collimate an output of the reflective coupler. A second refractive element may then focus the collimated pump light into the gain medium. The refractive elements may be, but are not limited to, lenses, such as simple plano-convex lenses or gradient index lenses. FIG. 3b shows another embodiment. This embodiment further comprises at least one optical fiber 315 guiding the output of the optical pump source to the reflective funnel. Many alternative embodiments are readily apparent.

The geometry of interior volume 165 (see FIG. 1) may be designed by iterative calculations using a ray or wave optics model. Computational tools incorporating these optics models are readily available commercially. In the calculations, the input is the known characteristics of optical pumping source 100 and a particular geometry and reflectance characteristic of the interior volume. The result of the calculations is the reflective coupler output, which is then compared to a desired output for the laser of interest. Though not preferred, it is also possible to optimize a design empirically.

In a particular design, the geometry of interior volume 165 is constrained by at least two requirements. First, reflective surfaces 170 must not allow a significant amount of retro-reflections within the interior volume. Second, while light must undergo reflections at the reflective surfaces in order to alter the spatial intensity distribution of optical pump source 100, the number of reflections must be consistent with the required laser input. Typical embodiments have limiting rays 105 experiencing less than about ten or about seven or about five reflections while traversing the interior volume. Excessive numbers of reflections lead to a substantial throughput loss for the reflective coupler, which degrades efficiency and laser performance. Increased numbers of reflections also increase the NA of the beam exiting the reflective coupler. Thus, the overall laser design must carefully match the properties of the gain medium in the optical resonator to the pumping radiation incident on it by considering the optics of the reflective coupler, optical pumping source and other elements in the optical system.

Typical embodiments of interior volume 165 have entrance aperture 180 having a larger area than exit aperture 190 since it is often desirable to increase the intensity or fluence of the diode source when pumping a laser crystal such as Nd:YAG. Particular embodiments have a ratio of the entrance aperture area to exit aperture area that is greater than about five, or between about 5 and about 50. Typical embodiments of the interior volume geometry include cross-sections that are circular, or elliptical, or polygonal. Typical embodiments have the interior volume filled with ambient atmosphere, or a purging gas. Particular embodiments have the interior volume filled with a liquid.

FIG. 4a–4d show spatial intensity distributions across exit aperture 190 (see FIG. 1) for several embodiments of the geometry of interior volume 165. In FIG. 4a–4d, reflective coupler 110, exit aperture 190, intensity distributions across the exit aperture 410, maximum 420 and local maximum 430 are shown. From FIG. 4a–4d, different embodiments of the present invention produce spatial intensity distributions across the exit aperture that are substantially uniform, or have one maximum, or has at least one local maxima. From FIG. 4a–4d, variable amounts of conditioning of the input distribution are obtained with different embodiments. Thus, according to aspects of this invention, the intensity profile and NA of the pump light as it exits the reflective coupler can be controlled and conditioned by the geometry of the coupler itself.

Figure 4A:
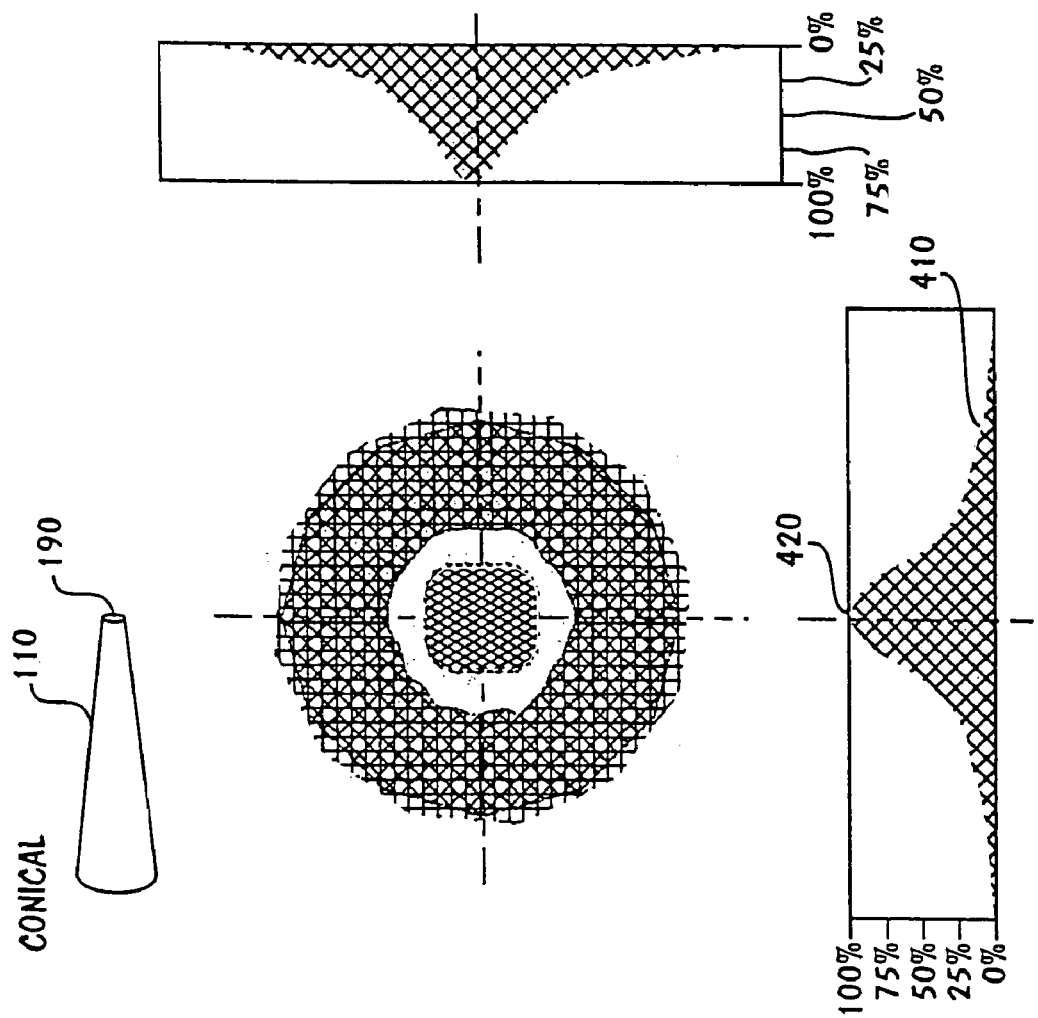
FIGS. 4a–4d show possible reflective coupler output beam intensity profiles illustrating the effects of design parameters such as length, entrance and exit aperture size and geometry.
Figure 4B:
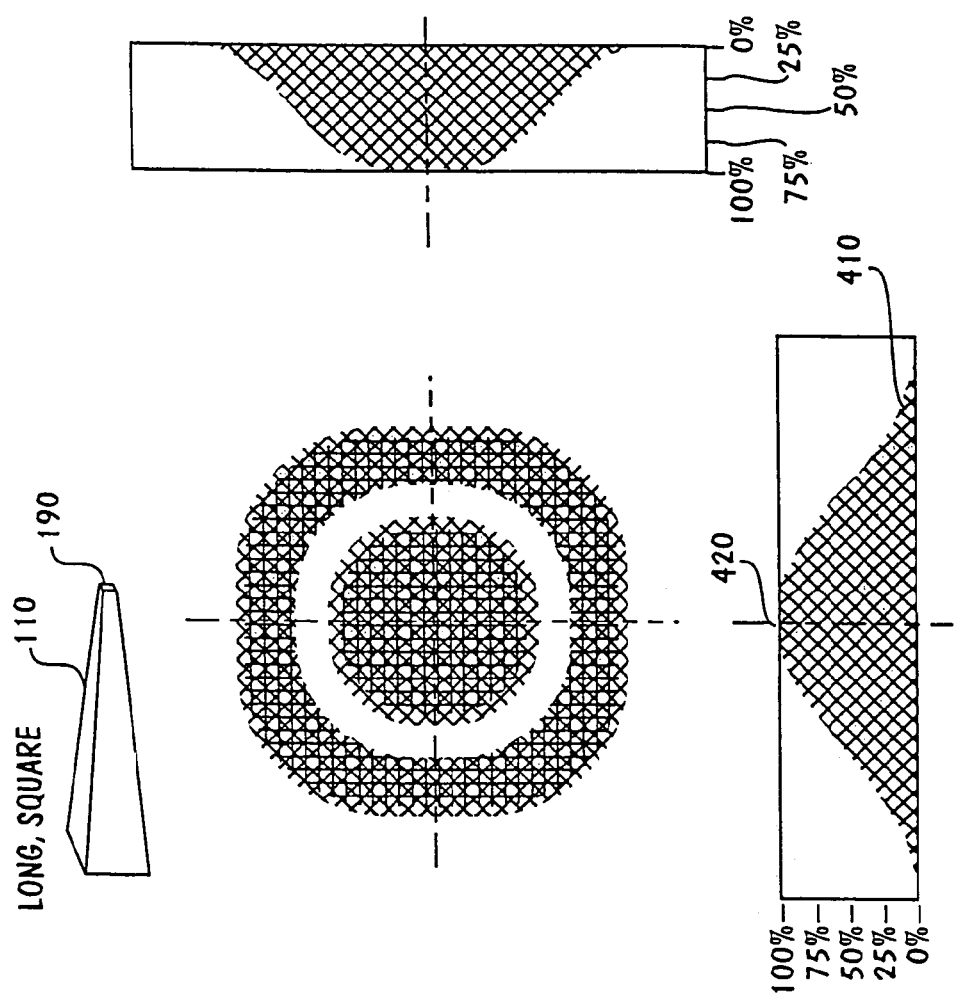
Figure 4C:
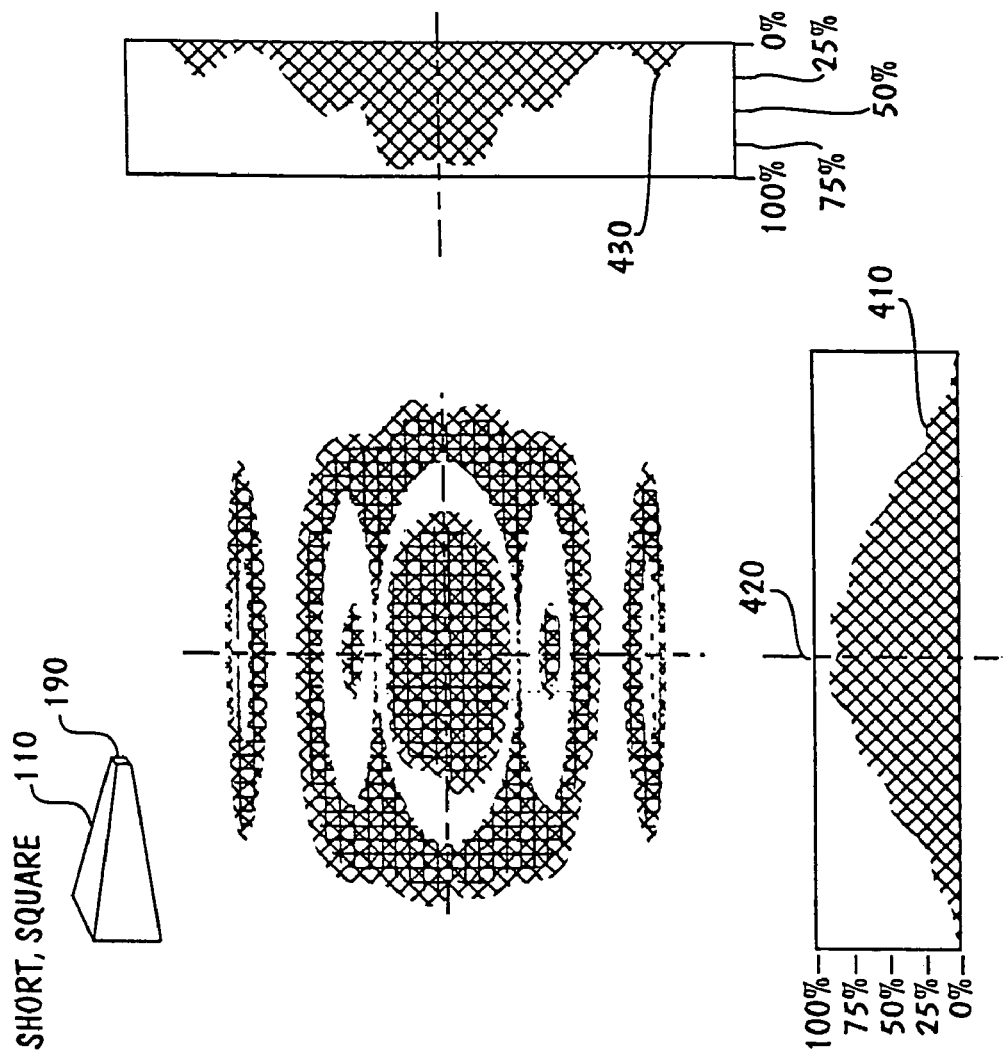
Figure 4D:
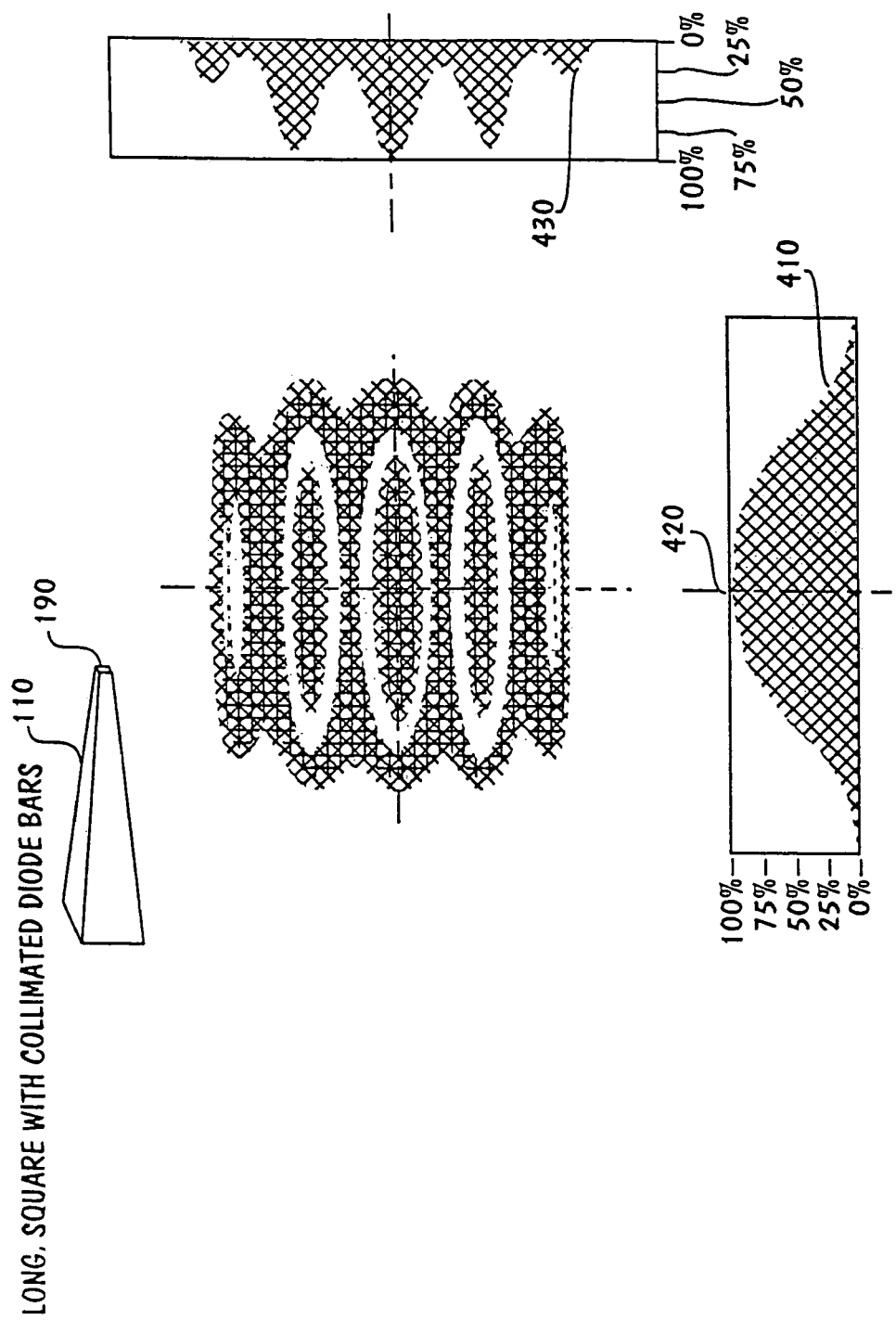

In a pumped laser system, a particular embodiment of a reflective coupler is matched to the characteristics of optical resonator 120 and gain medium 140 (see FIG. 1). In a preferred embodiment of such a system, the reflective coupler shown in FIG. 4b provides a smooth intensity profile and a minimal NA to the gain medium. In this preferred embodiment, a smooth intensity profile and a minimized NA of the pump light maximizes the laser efficiency.

The output of reflective coupler embodiments according to the present invention, as illustrated in FIG. 4a–4d, is insensitive to small perturbations in the positioning of the input from the optical pump source. Thus, typical laser system embodiments allow the optical pump source to be easily removed and replaced without need for realignment of the laser cavity or coupling mechanism. This is a great practical advantage for laser systems operated in the field.

Figure 5:
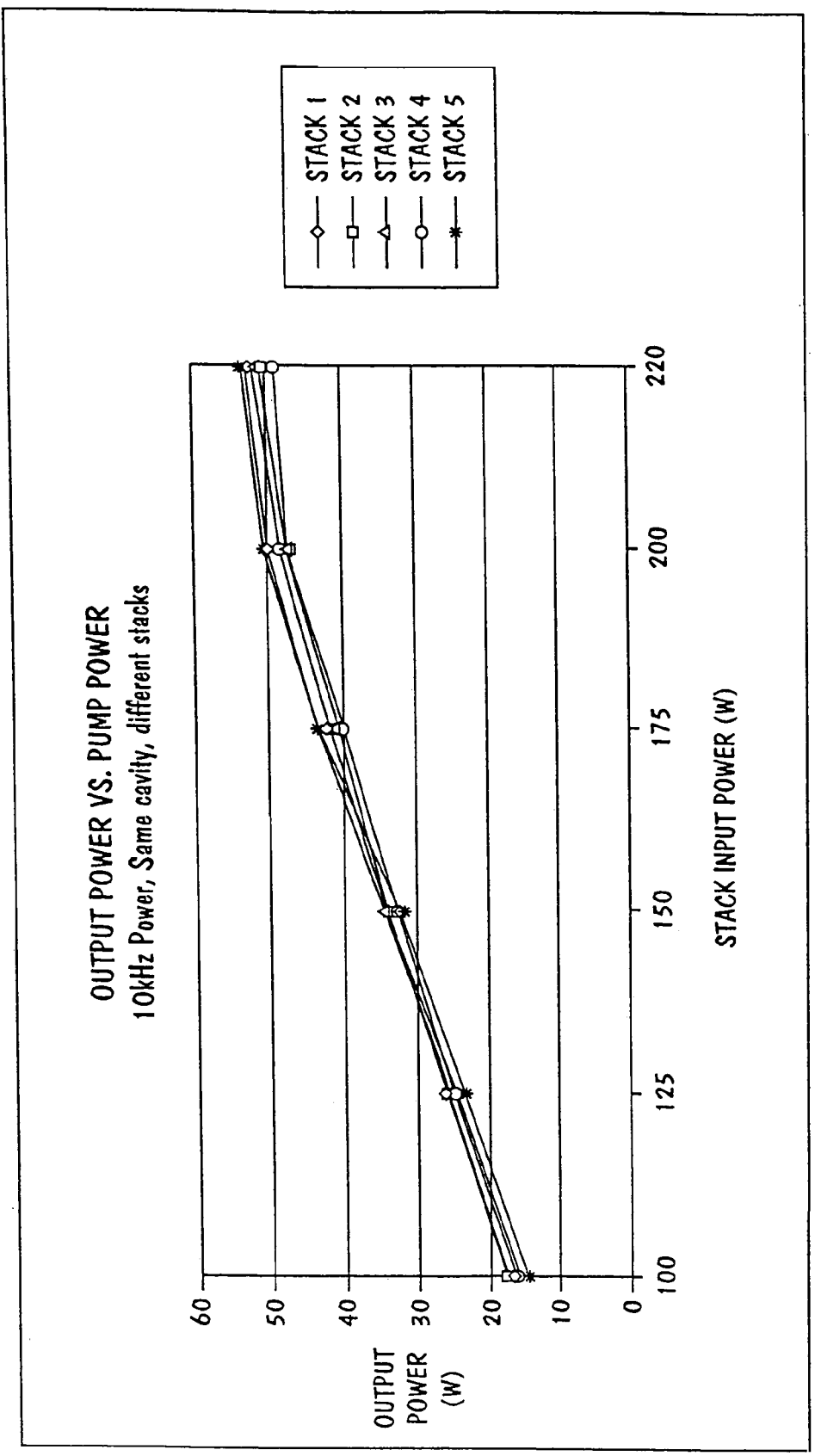
FIG. 5 shows output power vs. pump power for a laser cavity using several different pump sources. To illustrate the aspect of the field-replaceability of the pump source enabled by the reflective coupler only the pump source was changed when collecting the data. The cavity and reflective coupler were not adjusted.

FIG. 5 shows output power of a laser resonator versus pump power for several different pump sources. For the curves shown in FIG. 5, it is noteworthy that only the pump sources were changed. The resonator and reflective coupler were not adjusted or realigned. As shown by the near-coincidence of the curves in FIG. 5, the present invention enables replacement or servicing without readjustment or realignment of the laser head, such as could be necessary or desired in field use.

Figure 6:
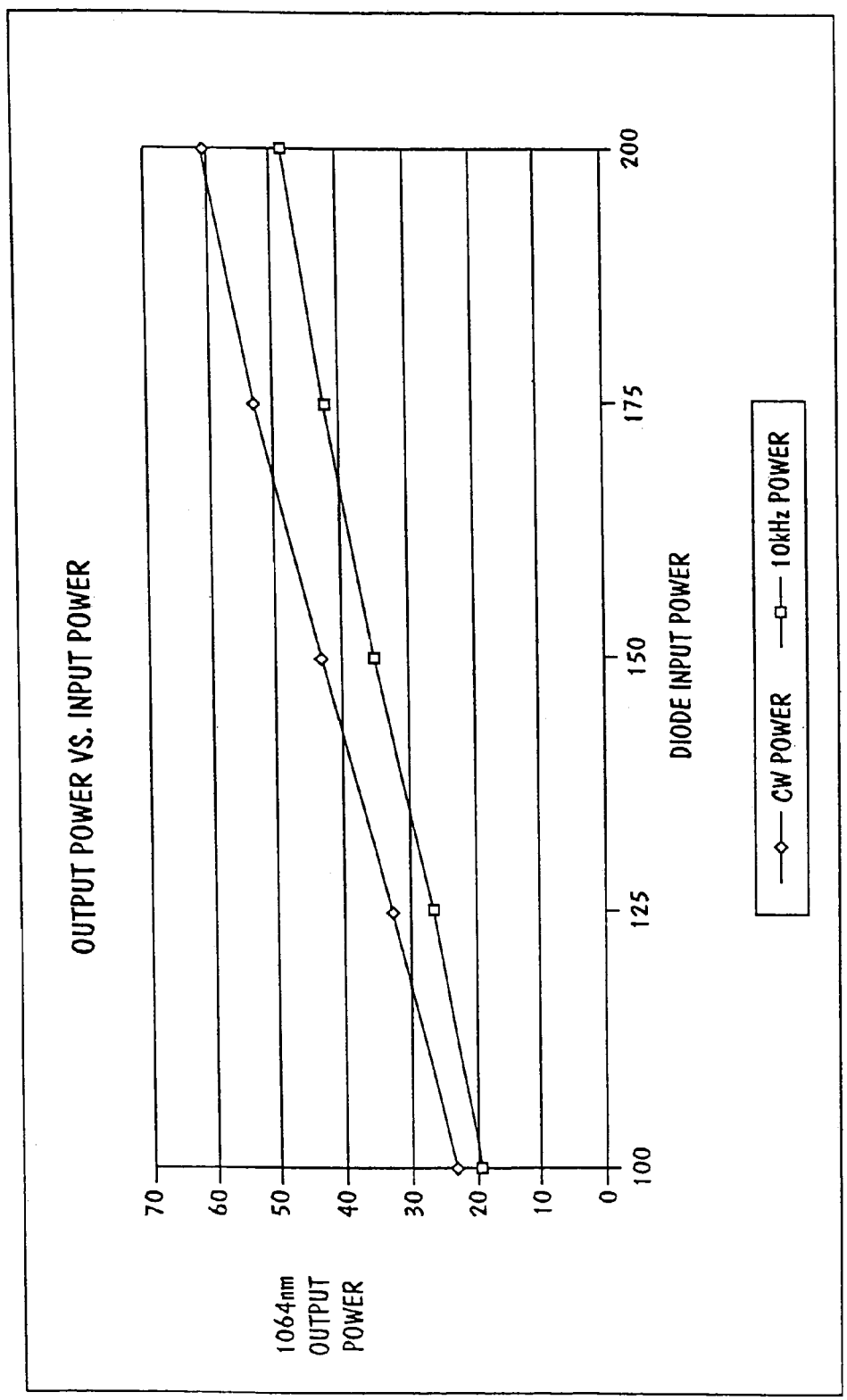
FIG. 6 shows output power vs. input power of laser system using a preferred embodiment of the reflective coupler.

FIG. 6 shows output power vs. input power for a laser resonator according to a particular embodiment of this invention. Continuous wave (CW) output power of the laser cavity is 60W with a diode pump power of 200W and $M^2<19$. Output power of the laser cavity when Q-switched at 10 kHz is 48W with a pulse width of 170 ns and an $M^2<12$. An acousto-optic device may be used to Q-switch the cavity, as is known in the art. Such devices are available from a number of vendors including Neos Technology, Melbourne. Fla.

The foregoing description of various embodiments of the invention has been presented for purposes of illustration and description. It is not intended to limit the invention to the precise forms disclosed. Many modifications and equivalent arrangements will be apparent.

What is claimed is:

1. An optically pumped laser apparatus, comprising: at least two reflectors defining an optical resonator cavity and an optical axis; a gain medium positioned inside of the optical resonator cavity, disposed about the optical axis; an optical pumping source positioned outside of the optical resonator cavity; a reflective coupler with a coupler body and an interior volume passing therethrough, the interior volume bounded by a reflective surface, an entrance aperture and an exit aperture, the interior volume being substantially transparent to radiation from the optical pumping source, the reflective surface having a high reflectivity matched to radiation from the optical pumping source, the entrance aperture positioned proximal to the optical pumping source and the exit aperture positioned distal to the optical pumping source, the reflective coupler directing radiation from the optical pumping source into the optical resonator cavity and gain medium with a controllable numerical aperture and spatial intensity distribution across the exit aperture.

2. The apparatus of claim 1, wherein the reflective surface is formed by a coating layer deposited on the coupler body.

3. The apparatus of claim 2, wherein the coating layer consists of multi-layer dielectric coatings.

4. The apparatus of claim 1, wherein the reflective surface is substantially metallic.

5. The apparatus of claim 2, wherein the coating layer is formed from at least one of a set of coating materials consisting of gold, silver, nickel and chrome.

6. The apparatus of claim 1, wherein the area of the entrance aperture is greater than the area of the exit aperture.

7. The apparatus of claim 6, wherein a ratio of the entrance aperture area to the exit aperture area is between about 5 and about 50.

8. The apparatus of claim 6, wherein the ratio of the entrance aperture area to the exit aperture area is about 10 to about 30.

9. The apparatus of claim 1, wherein a cross-section of the interior volume is polygonal.

10. The apparatus of claim 1, wherein a cross-section of the interior volume is circular.

11. The apparatus of claim 1, wherein a cross-section of the interior volume is elliptical.

12. The apparatus of claim 1, wherein a number of reflections experienced by limiting rays from the optical pumping source traversing the interior volume is less than about 10.

13. The apparatus of claim 1, wherein a spatial intensity distribution across the exit aperture is substantially uniform.

14. The apparatus of claim 1, wherein the NA at the exit aperture is minimized.

15. The apparatus of claim 1, wherein the slope of the spatial intensity distribution across the exit aperture has one maximum.

16. The apparatus of claim 1, wherein the slope of the spatial intensity distribution across the exit aperture has at least one local maxima.

17. The apparatus of claim 1, wherein the optical pumping source comprises at least one diode laser.

18. The apparatus of claim 17, wherein the optical pumping source further comprises at least one refractive element positioned to collimate an output of the at least one diode laser.

19. The apparatus of claim 17, wherein the optical pumping source further comprises at least one optical fiber to guide an output of the at least one diode laser.

20. The apparatus of claim 1, further comprising a cooler in thermal communication with the coupler body.

21. The apparatus of claim 20, wherein the cooler is substantially a conduction cooler.

22. The apparatus of claim 20, wherein the cooler is substantially a convection cooler.

23. The apparatus of claim 1, wherein the inner volume is filled with a liquid.

24. An optically pumped laser apparatus, comprising: at least two reflectors defining an optical resonator cavity and an optical axis; a gain medium positioned inside of the optical resonator cavity, disposed about the optical axis; an optical pumping source positioned outside of the optical resonator cavity; a reflective coupler with a coupler body and an interior volume passing therethrough, the interior volume bounded by a reflective surface, an entrance aperture and an exit aperture, the interior volume being substantially transparent to radiation from the optical pumping source, the reflective surface having a high reflectivity matched to radiation from the optical pumping source, the entrance aperture positioned proximal to the optical pumping source and the exit aperture positioned distal to the optical pumping source, the reflective coupler directing radiation from the optical pumping source into the optical resonator cavity and gain medium with a controllable numerical aperture and spatial intensity distribution across the exit aperture, and the length of the reflective coupler is optimized to provide a smooth intensity profile of minimized numerical aperture and a high transmission.

25. The apparatus of claim 24, wherein the high reflectivity is a transmission percent of at least 75%.

26. The apparatus of claim 24, wherein the NA is Less than about 0.5.

27. The apparatus of claim 24, wherein a product of an exit aperture size times an exit aperture NA is nearly the same as an input aperture size times an input pumping source NA.

* * * * *